United States Patent
Mou et al.

(10) Patent No.: US 8,995,080 B1
(45) Date of Patent: Mar. 31, 2015

(54) NON-DESTRUCTIVE DETECTION OF SLIDER CONTAMINATION

(71) Applicant: Seagate Technology LLC, Cupertino, CA (US)

(72) Inventors: James Mou, Eden Prairie, MN (US); Daniel Brown, Savage, MN (US); Robert German, Jordan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/502,625

(22) Filed: Sep. 30, 2014

(51) Int. Cl.
G11B 21/02 (2006.01)
G11B 5/596 (2006.01)

(52) U.S. Cl.
USPC .......................................... 360/75; 360/77.04

(58) Field of Classification Search
CPC .... G11B 5/6005; G11B 5/59633; G11B 5/54; G11B 5/59627; G11B 5/5534; G11B 21/106; G11B 5/5521
USPC ............... 360/77.04, 75, 78.12, 294.1, 73.11, 360/78.04, 31, 55
See application file for complete search history.

(56) References Cited

U.S. PATENT DOCUMENTS

| | | |
|---|---|---|
| 5,751,517 A | 5/1998 | Agarwal |
| 6,097,559 A | 8/2000 | Ottesen et al. |
| 6,853,508 B2 | 2/2005 | Smith et al. |
| 6,989,671 B2 | 1/2006 | Zhu et al. |
| 7,595,964 B2 * | 9/2009 | Oh et al. ................... 360/294.1 |
| 7,982,987 B2 | 7/2011 | Deng et al. |
| 8,665,546 B1 | 3/2014 | Zhao et al. |
| 8,711,508 B2 | 4/2014 | Kurita et al. |
| 2008/0278835 A1 | 11/2008 | Dakroub et al. |

FOREIGN PATENT DOCUMENTS

WO 94/22025 A1 9/1994

* cited by examiner

Primary Examiner — Nabil Hindi
(74) Attorney, Agent, or Firm — Hall Estill Attorneys at Law

(57) ABSTRACT

Apparatus and method for non-destructive detection of contamination on a slider in a data storage device. In some embodiments, the slider supports a read element adjacent a rotating data recording medium. A non-repeatable runout (NRRO) component of a position error signal (PES) obtained from readback signals transduced from the read element is extracted. A power spectral density (PSD) analysis of the NRRO component is performed to identify a peak power level, and slider contamination is detected responsive to the peak power level.

20 Claims, 6 Drawing Sheets

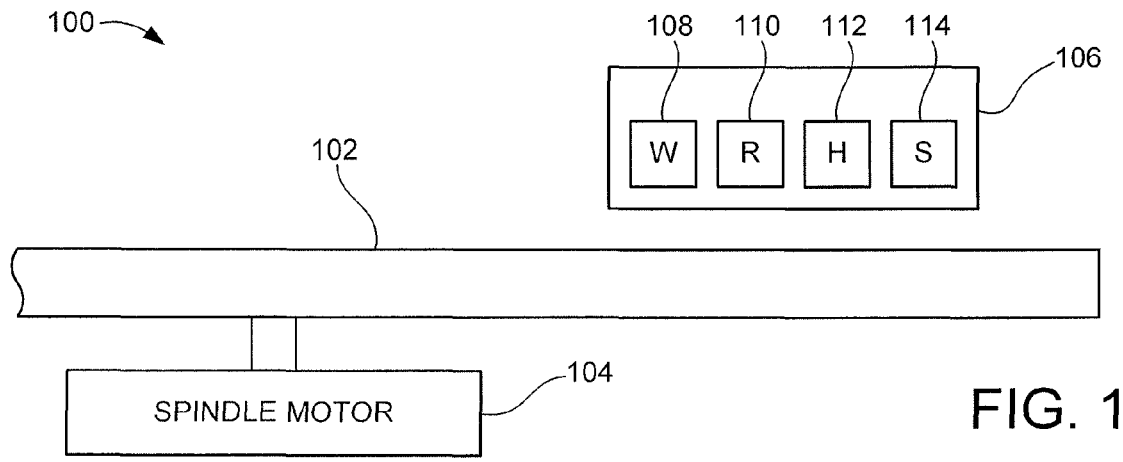
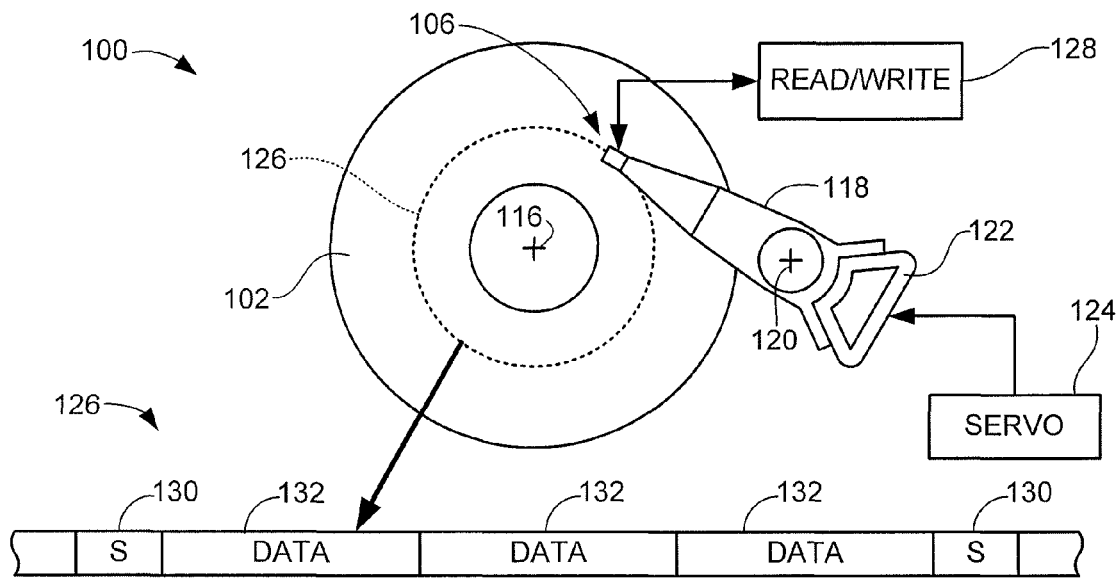
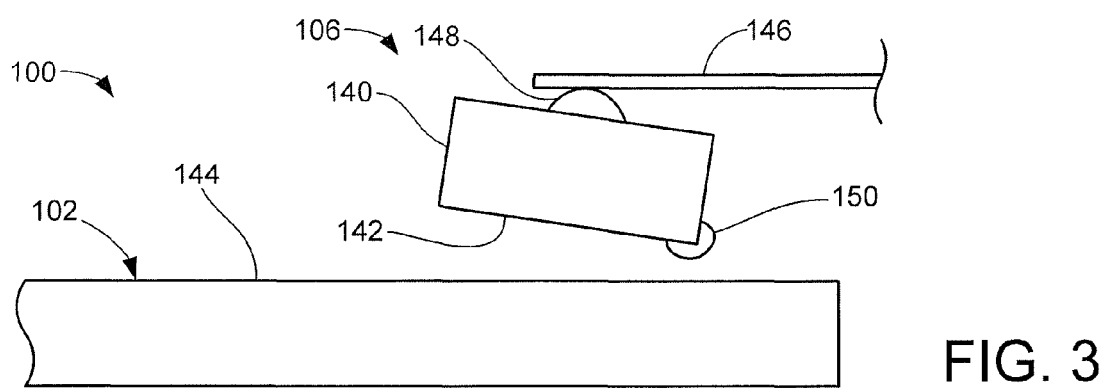

NON-DESTRUCTIVE DETECTION OF SLIDER CONTAMINATION

SUMMARY

Various embodiments of the present disclosure are generally directed to the non-destructive detection of contamination on a slider in a data storage device.

In some embodiments, a method includes extracting a non-repeatable runout (NRRO) component of a position error signal (PES) obtained from readback signals transduced from a read element supported by the slider. A power spectral density (PSD) analysis of the NRRO component is performed to identify a peak power level, and slider contamination is detected responsive to the peak power level.

In other embodiments, an apparatus includes a rotatable data recording medium, a slider and a read element. The slider has an air bearing surface adapted to interact with fluidic currents established by rotation of the medium to hydrodynamically support the read element adjacent the medium. The read element is adapted to generate position signals indicative of the position of the read element relative to a track defined on the medium. A slider contaminant analysis engine detects a presence of contamination on the slider responsive to a peak power level in a power spectral density (PSD) waveform obtained from a non-repeatable runout (NRRO) component of a position error signal (PES) obtained in relation to the position signals generated by the read element.

In other embodiments, an apparatus includes a data storage device and a host processing device connected to the data storage device. The data storage device has a rotatable data recording medium, a slider having an air bearing surface (ABS) adapted to interact with fluidic currents established by rotation of the medium to hydrodynamically support the slider adjacent thereto, a read element adapted to generate position signals indicative of the position of the slider relative to a track defined on the medium and a servo circuit adapted to generate a position error signal (PES) in relation to the position signals generated by the read element. The host processing device has a slider contaminant analysis engine adapted to detect a presence of contamination on the slider. The slider contaminant analysis engine includes a non-repeatable runout (NRRO) extractor to extract NRRO components of the PES, a power spectral density (PSD) module to generate PSD waveforms of the NRRO components, a peak detector module to identify peak values in the PSD waveforms, and a statistical analysis module which detects the presence of contamination responsive to a two-sample t-test between first and second populations of peak values from the peak detector module.

These and other features which characterize various embodiments of the present disclosure can be understood in view of the following detailed discussion and the accompanying drawings.

BRIEF DESCRIPTION OF THE DRAWINGS

FIG. 1 is a functional block representation of aspects of a data storage device constructed and operated in accordance with various embodiments of the present disclosure.

FIG. 2 shows additional aspects of the data storage device of FIG. 1.

FIG. 3 is a schematic depiction of contamination on a slider of the data storage device of FIGS. 1-2.

DETAILED DESCRIPTION

Figure 4:
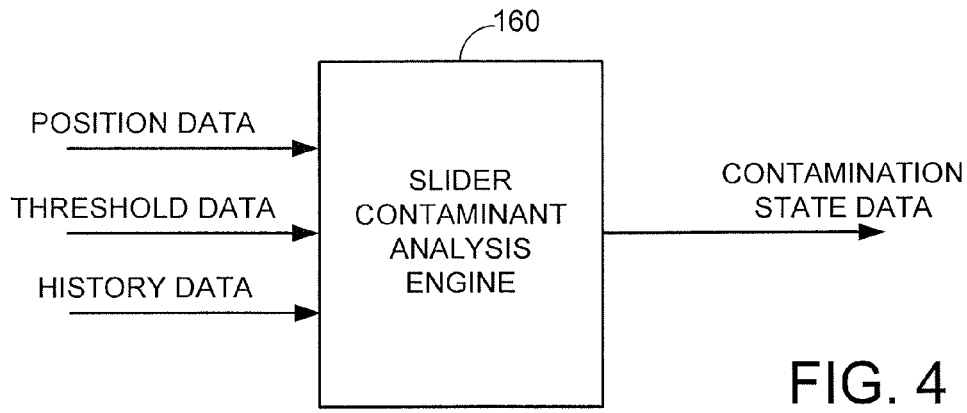
FIG. 4 represents a slider contaminant analysis engine used to detect contamination such as represented in FIG. 3.

The present disclosure is generally directed to the detection of contamination in a data storage device using non-destructive and non-invasive techniques.

Some data storage devices use rotating data recording media which are accessed through a corresponding array of data (read/write) transducers. The transducers incorporate sliders with one or more air bearing surfaces (ABS) which hydrodynamically support the sliders in close proximity to the media surfaces by fluidic currents (e.g., air) established by high speed rotation of the media.

The sliders support one or more write elements, such as inductive write coils, to magnetically write data in the form of alternating magnetic patterns to tracks defined on the media surfaces. The sliders further support one or more read elements, such as magneto-resistive (MR) sensors, to subsequently sense the magnetic patterns to recover the previously stored data.

Because of continuing efforts to manufacture data storage devices with ever higher data storage densities within existing overall form factors, various operational parameters continue to decrease such as slider clearance distances (fly heights) and track densities. Depending upon the construction of the data storage device, a typical slider fly height may be measured in terms of a few angstroms, (Å, $10^{-10}$ m) and a typical track density may be on the order of several hundred thousand tracks per inch (e.g., $10^5$ TPI or more). The interior of a data storage device is strictly controlled in an effort to provide a stable environment for the operation of the device.

The presence of contaminants within the interior of a data storage device can therefore significantly degrade the performance the device. Contamination sources can include, but are not limited to, leaked oil from a spindle motor used to rotate the media, grease from a pivot cartridge used to rotate the data transducers, outgassing of various materials used within the device, and hydrocarbon-based lubrication applied to the media surfaces.

Accumulation of even small amounts of these and other types of contaminants onto a slider ABS can introduce a number of performance failure modes such as translational head modulation, changes in fly height, media-transducer contact events and media/transducer damage.

Contamination on a slider can be detected through microscopic evaluation of the slider to identify the type(s) and location(s) of the contaminants. It will be appreciated that such evaluations are intrinsically destructive and intrusive, since it is necessary to physically disassemble the data storage device in order to gain visual access to the sliders. There is accordingly a need for improvements whereby slider contamination can be detected and characterized using non-destructive, non-intrusive means.

Various embodiments of the present disclosure generally provide an apparatus and method for such contaminant detection. As explained below, some embodiments include steps of using an air bearing surface of a slider to support a read element adjacent a rotating data recording medium. The read element transduces servo data from the medium to generate a position error signal (PES) indicative of position of the read element with respect to the medium.

A non-repeatable runout (NRRO) component of the PES is extracted, and a power spectral density (PSD) analysis is applied to the NRRO component to provide a PSD waveform over a selected frequency range. A peak power level is identified from the PSD waveform, and the presence (or absence) of contamination is determined in relation to the peak power level.

In some cases, one or more PSD analyses are initially performed upon the slider to generate a first peak value providing a baseline performance level for the slider. The PSD analyses are subsequently repeated during normal operation to provide a second peak value showing subsequent performance. A statistical analysis of the first and second peak values, such as through the use of a two-sample t-test, is used to determine whether the second peak level is statistically different as compared to the first level. Alternatively, one or more thresholds may be established, including based on the first peak value, and contamination is determined though comparison of the second peak value to the threshold(s).

In still further cases, history data are accumulated and used during subsequent analyses to detect trends that signify the accumulation of slider contamination. Depending on empirical measurements and the construction of a particular device, different types of contamination may provide different characteristic responses, so that not only the presence of contamination may be detected, but the specific type of contamination may also be likely identified.

In this way, devices can be evaluated using efficient, non-destructive and non-intrusive protocols that do not require the disassembly of the device. Empirical analysis has found the techniques to be highly effective in correctly identifying the presence of contamination on a variety of different types of devices. Devices found to have detected contamination can be subsequently evaluated using other means, such as through visual inspection, to confirm the source of the contamination, leading to possible rework of the contaminated device and processes improvements to reduce future occurrences.

Other features and advantages of various embodiments can be understood beginning with a review of FIG. 1 which provides a generalized functional block diagram of relevant aspects of a data storage device 100.

The data storage device 100 includes one or more rotatable data recording media (e.g., discs) 102 that are rotated during operation at a constant high speed by a spindle motor 104. Each recording surface of the media 102 is provided with an adjacent data transducer 106. The exemplary transducer 106 in FIG. 1 is shown to include one or more write (W) elements 108 and one or more read (R) elements 110 adapted to respectively write data to and read data from the associated recording surface. A heater (H) 112 may be adapted to adjust the fly height of the transducer through thermal expansion effects, and one or more proximity sensors (S) 114 detect proximity and/or contact between the transducer 106 and the medium 102.

FIG. 2 shows additional aspects of the storage device 100 of FIG. 1. The magnetic recording medium 102 is rotated by the spindle motor 104 (FIG. 1) about a central axis 116. An actuator 118 is disposed adjacent an outermost peripheral edge of the disc(s) 112 and pivots about a pivot point 120.

The transducer 106 (FIG. 1) is mounted at a first end of the actuator 118, and a voice coil 122 of a voice coil motor (not separately shown) is mounted at an opposing second end of the actuator. Controlled application of current to the voice coil 122 by a servo control circuit 124 induces controlled rotation of the actuator and hence, alignment of the transducer 126 with tracks defined on the media surfaces. One exemplary track is represented at 126. Write data to be written to the track 126 during a write operation are supplied to the write element 108 via a read/write circuit 128. Read back signals transduced by the read element 110 during a read operation are recovered and processed by the circuit 128 to return the originally stored data.

The tracks 126 may take an embedded servo format as shown in FIG. 2 so that the media surfaces are provisioned with spaced apart servo data fields 130. The servo data fields 130 provide position control information to the servo control circuit 124 to enable closed-loop control of the transducer 106. Data blocks 132, such as in the form of fixed-sized addressable sectors, are stored along the tracks 126 between adjacent pairs of the servo fields 130. While three (3) data blocks 132 are shown in FIG. 2, any number of data blocks, including partial data blocks, may be provided between adjacent pairs of the servo fields 130.

While not limiting, it is contemplated that user data from a host device are stored in the data blocks (sectors) 132. The data are stored using perpendicular magnetic recording techniques so that the write element 108 of the transducer 120 applies a time varying bi-directional write field to the track 126 to write the data in perpendicular domains (e.g., perpendicular to the direction of travel of the head relative to the disc). Other recording techniques can be applied including longitudinal recording, heat assisted magnetic recording (HAMR), microwave assisted magnetic recording (MAMR), bit patterned media recording, discrete track media recording, shingled (e.g., partially overlapping) track recording, two dimensional magnetic recording (TDMR), multi-sensor magnetic recording (MSMR), etc.

FIG. 3 is a simplified schematic depiction of the transducer 106 and the data storage medium 102 from FIGS. 1-2. The transducer 106 includes a slider 140 having a substantially rectilinear body with an air bearing surface (ABS) 142 in facing relation to a recording surface 144 of the medium 102. The ABS 142 interacts with the fluidic currents established by rotation of the recording surface 144 to normally establish controlled hydrodynamic support (flight) of the slider 140 adjacent the surface 144.

The ABS 142 can take any number of forms as required, including negative pressure bearing surfaces and positive pressure bearing surfaces. The slider 140 can be designed to take any number of attitudes during flight, including nose-up (as generally shown), level, nose-down, etc. The various active elements 108, 110, 112, 114 shown in FIG. 1 may be supported by and/or directly formed on or in the slider body. For example, the write and read elements 108, 110 may be placed along a trailing edge of the slider with respect to the direction of disc rotation.

The slider 140 is supported by a flexure 146 and gimbal 148. The flexure 146 is a flexible support member supported at the distal end of the actuator 118 (FIG. 2) to permit vertical displacement of the slider 106. The gimbal 148 allows multi-axial translation (gimbaling) of the slider to account for various skew angles and other effects.

Accumulated contamination on the slider 140 is generally represented at 150. In practice, the amount and location of such contamination can vary, so the depiction of the contamination 150 in FIG. 3 is merely illustrative and is not limiting. As noted above, sources of the contamination 150 can include, but are not limited to, the spindle motor 104 as it leaks lubricating oil, grease or other contaminants into the device 100; grease or other lubricants used by a cartridge bearing assembly (not shown) that facilitates rotation of the actuator 118 about pivot point 120; a layer of hydrocarbon lubricant (not shown) applied to the recording surface 144 of the medium 102 and which adheres to the slider 140, or any other source including outgassing components from within the interior of the device 100.

As will be appreciated, the accumulation of the contamination 150 onto the slider 140 can adversely affect the performance of the storage device 100. Depending on type and location, the contamination 150 can affect the efficiency and stability of the ABS 142, change the effective attitude (or other axial orientation) of the slider, change the fly height (clearance distance), introduce track mis-registration (TMR) effects as the contamination causes side-to-side oscillations as the system attempts to follow the track 126, etc. These and other effects can introduce write and read errors, delays in seek and track settle times, and in extreme cases, induce transducer/media contact and/or damage.

Accordingly, FIG. 4 shows a slider contaminant analysis engine 160 useful in accordance with various embodiments to detect slider contamination such as 150 in FIG. 3. Generally, the analysis engine 160 uses a number of data inputs such as position data, threshold data and history data to arrive at a declared contamination state for a given slider/media combination.

The analysis engine 160 can take a variety of forms and can incorporate hardware, software and/or firmware components. In some embodiments, at least aspects of the analysis engine 160 are incorporated into a programmable controller of the data storage device 100 used to provide top level control of the device during operation. In other embodiments, at least aspects of the analysis engine 160 can be incorporated into a host processing device such as a separate host computer connected to the storage device 100. The analysis engine can further incorporate or utilize inputs from other aspects of the data storage device, such as the servo circuit 124 in FIG. 2.

Figure 5:
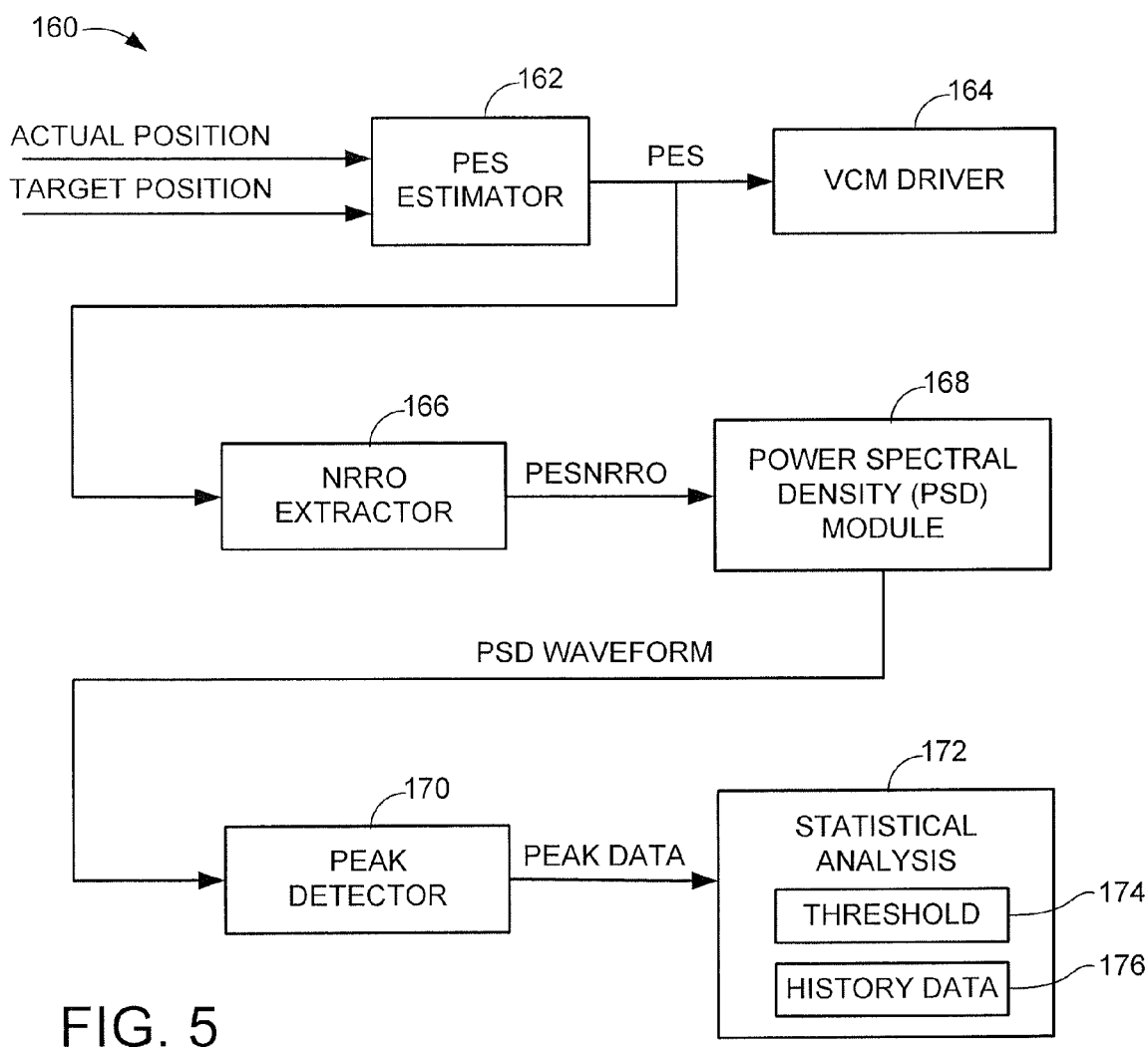
FIG. 5 shows a functional block diagram of the analysis engine of FIG. 4 in accordance with some embodiments.

FIG. 5 is a functional block representation of the analysis engine 160 of FIG. 4 in accordance with some embodiments. A position error signal (PES) estimator block 162 outputs a PES value responsive to an actual position value input and a target position value input. The target position will be a selected radial location with respect to a selected track. To provide a concrete example, the target position may be along a center line of the track 126 in FIG. 2.

The actual position will be the detected position with respect to the selected track, and may be expressed as a percentage of the track width with respect to the target position. The actual detected position for a given servo sample, may be, for example, a position corresponding to about 5% of the track width away from the center line of track 126 in the radial direction toward the innermost diameter (ID) of the disc adjacent center pivot 116 (see FIG. 2). While variety of mechanisms can be used to generate PES, in the present example the PES value output by the estimator 162 is the difference between the actual position and the target position (e.g., nominally 5% off track in the ID direction).

The PES value is output (with or without additional processing) to a VCM driver block 164 to adjust the current applied to the VCM coil 122 to correct this position error. It will be appreciated that the servo circuit 124 uses an observer/estimator model so that a number of servo samples n, and corresponding PES values n, are generated over each revolution of the medium 102.

Those skilled in the art will recognize that in a real-world system as represented by the storage device 100, variations will be encountered in the PES values obtained during each revolution of the medium 102. Such variations arise due to a number of effects, including errors in the writing of the servo data, the inability of the servo control circuit 124 to exactly follow and maintain the read element(s) over the center line defined by the servo data, mechanical effects related to the bearing cartridge, windage effects, bias forces supplied to the transducer 106, the skew angle of the slider 140 with respect to the circumferential direction of travel, etc.

The PES values (or sequence) will thus have frequency components as the servo circuit 124 causes the transducer 106 to follow the selected track 126. These components can be broken down into repeating components that are experienced over each revolution, and non-repeating components that vary from one revolution to the next.

Repeating components, referred to as repeated runout (RRO), include those elements listed above that do not tend to change from one rotation to the next, such as errors in the placement of the servo data along the track, eccentricities due to shifted discs, etc. RRO components are generally provided at a frequency correlated to the disc rotational rate.

Non-repeating components, referred to herein as non-repeating runout (NRRO), are associated with different factors such as those listed above that tend to change from one rotation to the next. NRRO components thus have frequency components that tend to occur at frequencies other than those correlated to disc rotational rate.

The PES sequence values generated by the estimator 162 are supplied to a non-repeatable runout (NRRO) extractor block 166 which extracts the NRRO component of the PES values. It may be necessary to maintain the transducer 106 in a track following mode to follow the selected track (e.g., track 126) over multiple revolutions in order to enable the system to identify those components that repeat over each revolution and subtract those out to obtain the NRRO component. Any number of statistical methods can be used to extract the NRRO, including mean square techniques that characterize the NRRO components as "random noise" components in the signal.

The resulting NRRO component of the PES values, denoted as "PESNRRO," is supplied to a power spectral density (PSD) module 168. The PSD module 168 performs a power spectral density analysis on the PESNRRO samples to estimate the power spectrum of the NRRO component.

As will be recognized, power spectral density describes how power density of a signal or time series is distributed with frequency. A number of PSD techniques are known in the art and can be applied by the module 168, including parametric and non-parametric methods. A number of suitable methods include but are not limited to the so-called Welch Method, Levinson-Durbin Method, Yule-Walker Method and Burg Method. Some embodiments generally utilize the Burg Method as this system minimizes the average of the forward and backward linear prediction errors while producing high resolution and good reliability for slider contamination detection.

Because of the computationally extensive nature of PSD computations, some embodiments envision the use of any number of commercially available PSD software utility applications that can be loaded and executed on a personal computer, workstation or similar processing device. In such embodiments, either the raw PES sequence or the extracted PESNRRO is transferred from the data storage device 100 to such processing device for further processing by the PSD software.

For reference, processing carried out by the module 168 in accordance with the Burg Method in some embodiments can be generally characterized as evaluating the PESNRRO as a data sequence x(n) with samples n=0 to N−1. Forward linear prediction estimates of order m can be stated as:

$$\hat{x}(n) = -\Sigma_{k=1}^{m} a_m(k) x(n-k) \quad (1)$$

$$\hat{x}(n-m) = -\Sigma_{k=1}^{m} a_m(k) \hat{x}(n+k-m) \quad (2)$$

where $a_m(k)$ are prediction coefficients with k=0 to m−1, and m=1 to p. The corresponding forward and backward errors $f_m(n)$ and $b_m(n)$ can be defined as:

$$f_m(n) = x(n) - \hat{x}(n) \quad (3)$$

$$b_m(n) = x(n-m) - \hat{x}(n-m) \quad (4)$$

The least squares error $\xi_m$ can be stated as:

$$\xi_m = \min \Sigma_{n=m}^{K-1} [(f_m(n))^2 + (b_m(n))^2]$$

The error is minimized by selecting the prediction coefficients $a_m(k)$ as follows:

$$a_m(k) = a_{m-1}(k) + \lambda_m a_{m-1}(m-k) \quad (6)$$

with $1 \leq k \leq m-1$ and $\lambda_m = a_m(m)$, which is the mth reflection coefficient. Minimizing the least square error $\xi_m$ with respect to the complex valued function $\lambda_m$ provides:

$$\lambda_m = \frac{-\sum_{n=m}^{N-1} [f_{m-1}(n) b_{m-1}(n)]}{\frac{1}{2} \sum_{n=m}^{N-1} [(f_{m-1}(n))^2 + (b_{m-1}(n))^2]}. \quad (7)$$

This produces a PSD waveform that estimates the power spectrum based on frequency, with peaks indicative of frequencies of higher occurrence in the input sequence. As noted above, a PSD waveform can be formed using this technique or any number of other suitable techniques depending on the requirements of a given application.

Continuing with FIG. 5, the PSD waveform is supplied to a peak detector block 170 which identifies the peak value in the waveform. This peak value data is forwarded to a statistical analysis module 172 which thereafter, as explained below, applies statistical analysis methods to the input peak data to detect slider contamination. As mentioned in FIG. 4, the statistical analysis may include the use of threshold data 174 and history data 176.

Figure 6:
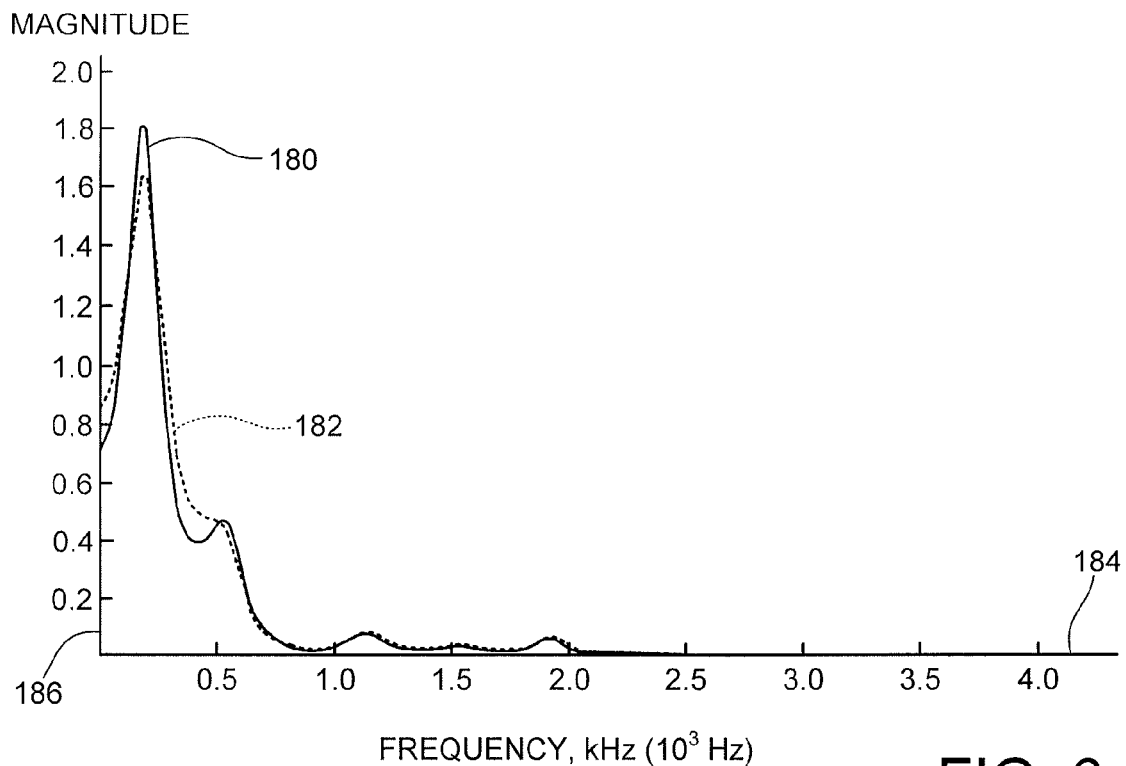
FIG. 6 is a graphical representation of exemplary PSD spectral responses for different sliders using the analysis engine of FIGS. 4-5 in some embodiments.

FIG. 6 is a graphical representation of exemplary PSD spectral responses for different sliders using the analysis engine of FIGS. 4-5 in some embodiments. FIG. 6 shows a first PSD waveform 180 (solid line) and a second PSD waveform 182 (dotted line) both plotted against a frequency x-axis 184 and a normalized power magnitude y-axis 186.

Generally, the first PSD waveform 180 corresponds to data obtained for a slider exhibiting significant contamination, and the second PSD waveform 182 corresponds to data obtained for a slider exhibiting substantially no contamination. As can be seen, each of the waveforms has a significant low frequency peak (in the range of around 250 Hz). The first waveform 180 has a peak with a higher magnitude of about 1.8 units, and the second waveform 182 has a peak with a lower magnitude of about 1.6 units. As explained below, the statistical analysis module 172 of FIG. 5 generally tests the statistical significance of the respective peaks to determine if the two are statistically different.

Figure 7:
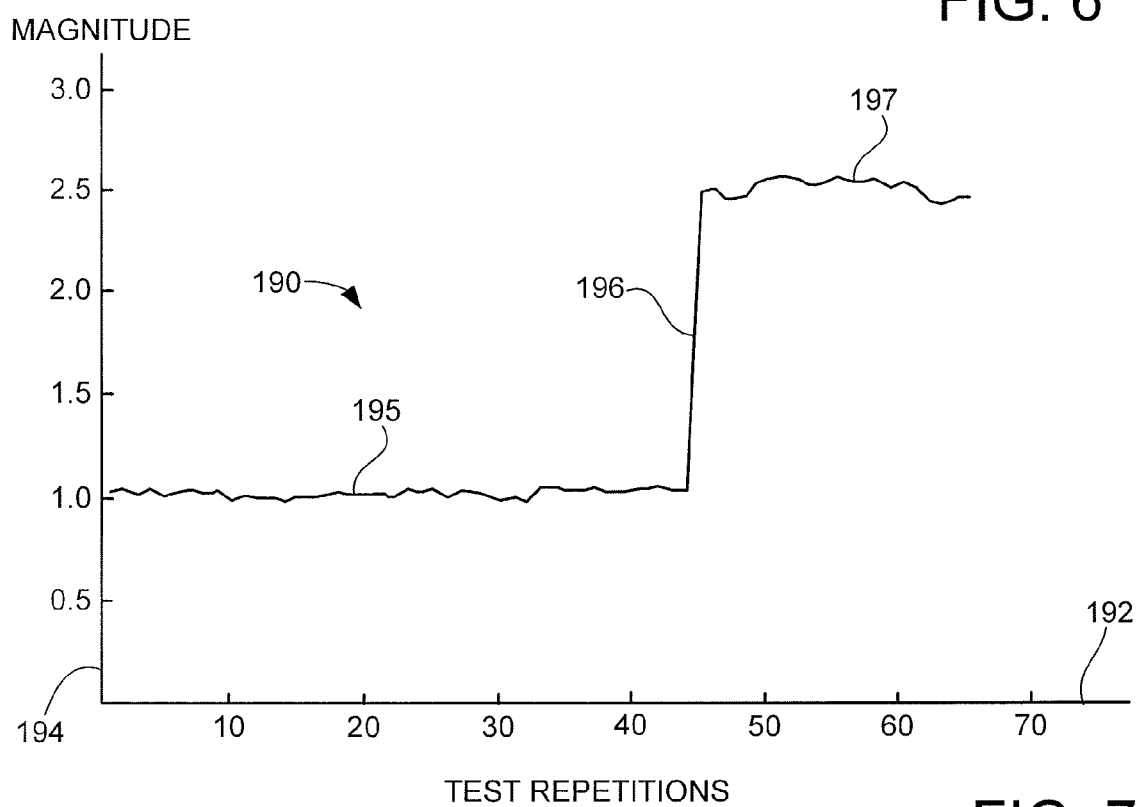
FIG. 7 is a graphical representation of a power spectral density (PSD) response curve obtained during operation of the analysis engine of FIGS. 4-5.

FIG. 7 is a graphical representation of a PSD response curve 190 obtained during operation of the analysis engine of FIGS. 4-5 over multiple evaluation cycles (test repetitions). The curve 190 is plotted against a test repetition x-axis 192 and a normalized power magnitude y-axis 194. The test data making up curve 190 is from a selected data storage device nominally similar to the device 100 presented above in which a number n of consecutive analyses were performed (e.g., about n=45) with the slider in a pristine state, after which contamination was purposefully introduced onto the slider to simulate a contamination condition.

As can be seen, the samples from curve 190 include a first set of substantially constant values along segment 195, a stepwise transition at segment 196, and then a second set of substantially constant values along segment 197. Each of the values corresponds to a peak value in the corresponding PSD waveform, as represented in FIG. 6. The uncontaminated peak samples all had a power spectral peak magnitude (normalized) of about 1.0. After the introduction of the contamination, the power spectral peak magnitude was consistently around 2.5. This significant change in the peak value confirms the ability of the analysis engine of FIGS. 4-5 to correctly and consistently detect the presence of slider contamination.

Figure 8:
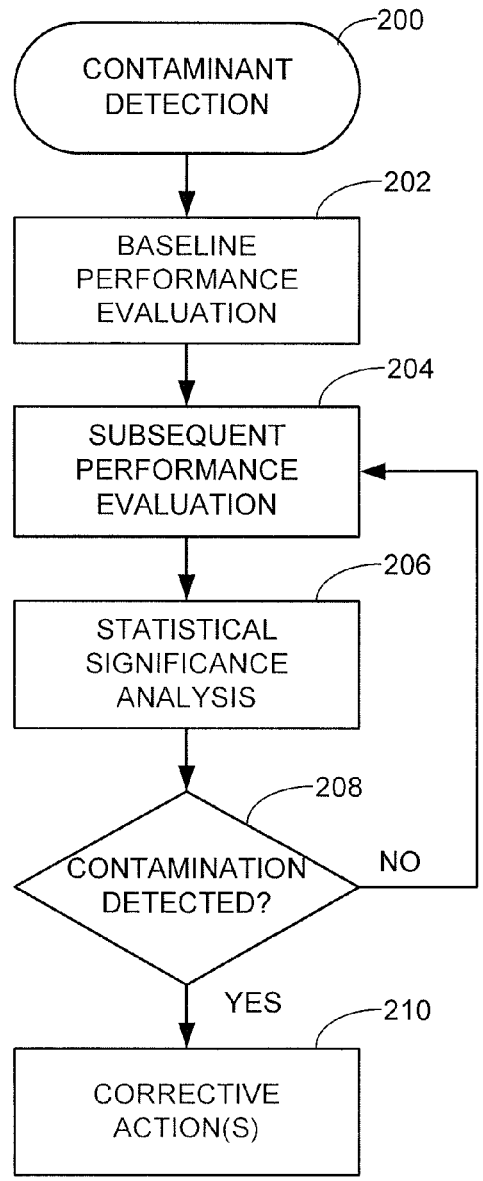
FIG. 8 is a contaminant detection routine illustrating steps carried out using the analysis engine of FIGS. 4-5 in some embodiments.

FIG. 8 is a flow chart for a contaminant detection routine 200 carried out in accordance with the foregoing discussion upon each of the slider/media surface combinations of a selected data storage device, such as the exemplary device 100. The routine 200 of FIG. 8 is a top level routine showing the overall process in accordance with various embodiments. Various portions of the routine are set forth in greater detail in subsequent routines which will be discussed next.

Generally, the routine 200 operates to evaluate the performance of a given slider/media surface combination over time to detect the accumulation of contamination. A first step 202 involves a baseline performance evaluation. This involves accumulating test data during an initial phase, such as but not necessarily limited to during device manufacturing.

Subsequent performance evaluation is carried out at step 204 at an appropriate time, such as at a later point during manufacturing qualification testing or during field use of the device after the device has been shipped to an end user. The subsequent evaluation can be carried out on a routine scheduled basis, or can be carried out responsive to the detection of performance issues or measurements associated with the device 100. For example, detection of a relatively large number of off-track errors, worsened bit error rate (BER), slower settling times, etc. may result in the scheduling of such subsequent evaluation as part of an error evaluation and recovery operation.

A statistical significance analysis is carried out at step 206 using the analysis module 172 of FIG. 5. Decision step 208 determines whether contamination is detected as a result of this analysis; if so, various corrective actions are taken as indicated by step 210, otherwise the routine returns to step 204 for the scheduling of the next evaluation at an appropriate time.

Figure 9:
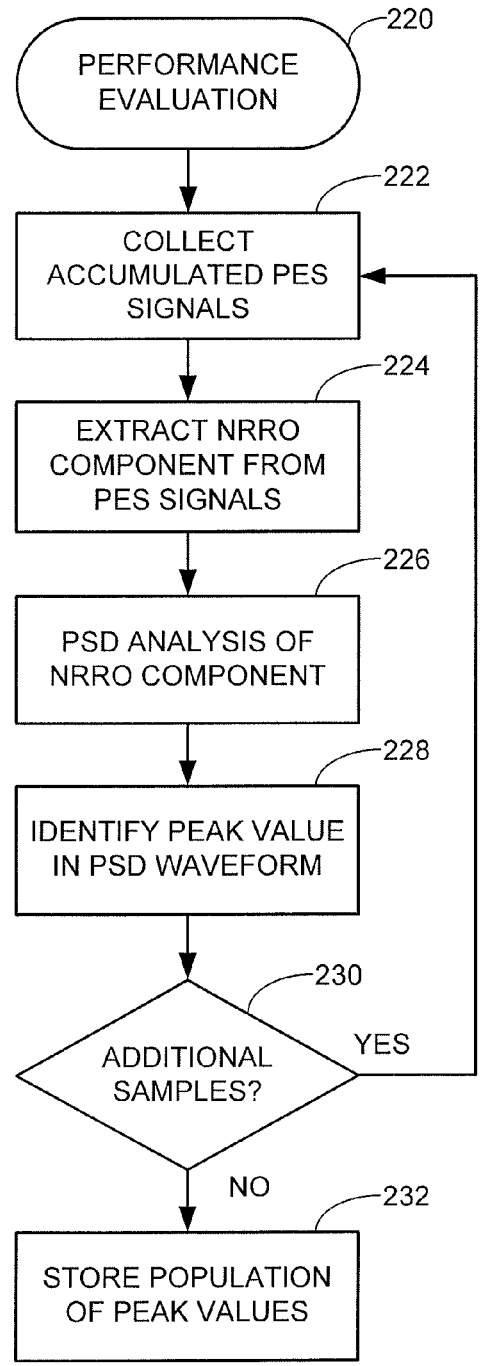
FIG. 9 is a performance evaluation routine performed during the operation of FIG. 8.

FIG. 9 sets forth a performance evaluation routine 220 to set forth the steps carried out during the respective evaluation steps 202, 204 in FIG. 8. Each execution of the routine 220 generally involves collecting multiple peak values, such as represented in FIGS. 6 and 7, for the slider/media combination under consideration. While not expressly described in FIG. 9, other aspects of the respective PSD waveforms can be accumulated and evaluated as well.

At step 222, accumulated PES signals are initially generated and collected. It is contemplated in some embodiments that PES signals will be obtained as described in FIG. 5 by causing a track following operation for a selected track at a selected radius on the associated medium. The samples may be accumulated over multiple consecutive revolutions. In further embodiments, multiple tracks are sampled; for example, at least a first track may be evaluated located near the outermost diameter (OD) of the medium 102, and at least a second track may be evaluated located near the innermost diameter (ID) of the medium 102. Additional tracks at other locations across the radial extent of the medium may be sampled as well.

In a zone based recording (ZBR) environment where multiple concentric zones are defined with tracks all written at a different selected frequency, one representative track may be selected from each zone. In other cases, empirical data may indicate tracks most likely to exhibit NRRO effects as a result of contamination, such as due to skew angle, etc., and such tracks may be selected for analysis. To reduce track-based variations, the track or tracks from which the data are obtained are recorded for future reference, and subsequent evaluations are carried out on those same tracks.

Once the PES signals (samples) are accumulated, processing continues to step 224 where the NRRO component of these samples is extracted to provide PESNRRO sequences. This can be carried out by the NRRO extractor circuit 166 in FIG. 5.

The PESNRRO data are next subjected to a PSD analysis at step 168. As discussed above, this may be carried out using a host device coupled to the data storage device 100, in which case the PES samples and/or the PESNRRO sequences may be transferred to such host device from the data storage device.

The PSD analysis generates one or more PSD waveforms, and the maximum peak value of each waveform is identified at step 228. This can be carried out by the peak detector block 170, which may apply a threshold or other detection methodology to detect the maximum value in the PSD waveform.

Decision step 230 determines whether additional samples should be obtained. It is contemplated that multiple passes through the routine are carried out to generate respective populations (sets) of samples which are thereafter evaluated for statistical significance. Any suitable respective numbers of samples can be provided in each group. In one case, seven (7) values identified as P1 through P7 are obtained for each set, so that the routine continues back to step 222 until all seven peak values are determined.

The routine then passes to step 232 where the accumulated peak values are stored in a suitable memory location. In some embodiments, the peak value may be stored locally on the storage device in a local non-volatile memory for future reference. An advantage of this approach is that subsequent analyses of that device will have the history data resident on the device itself for easy recall.

Figures 10, 11:
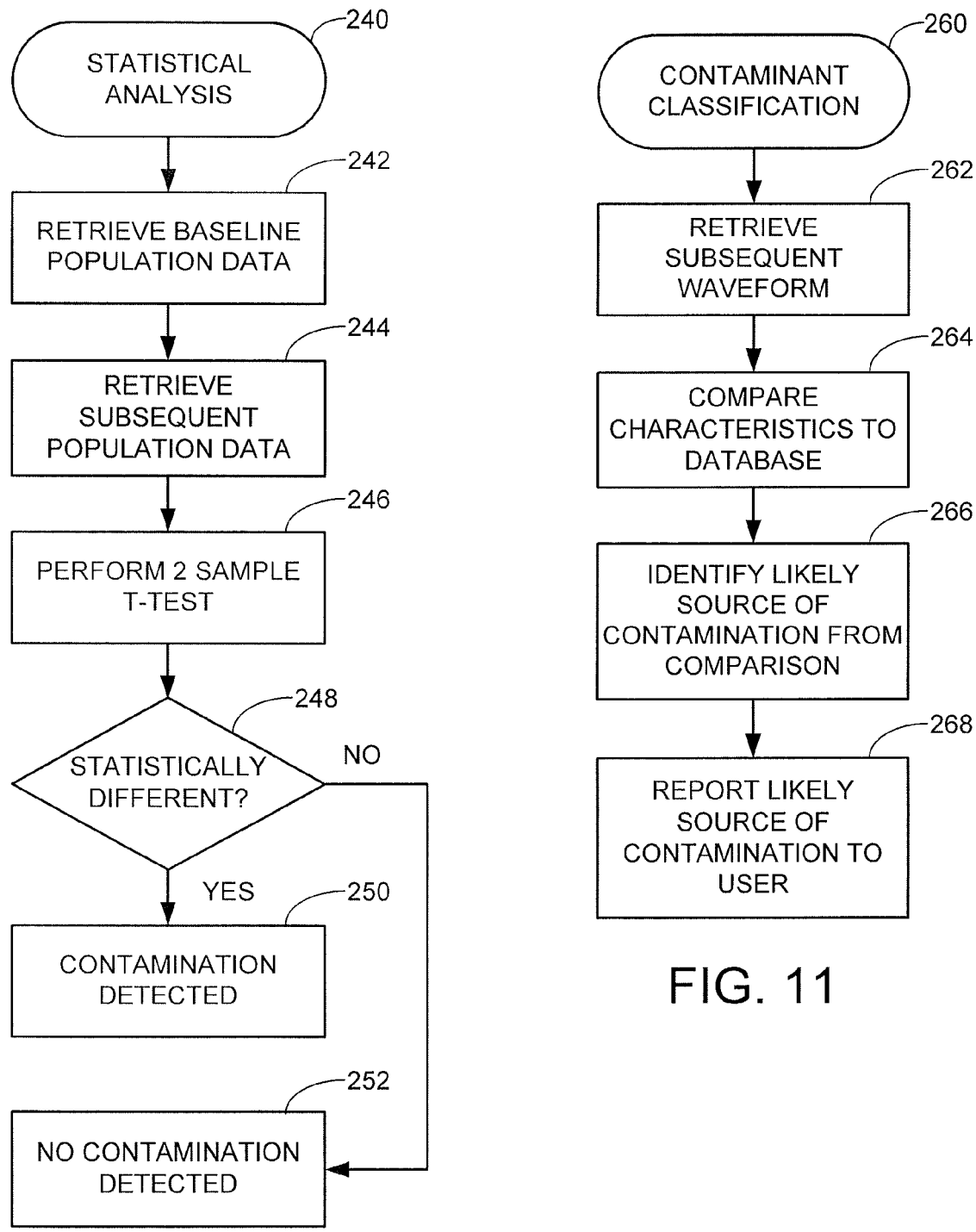
FIG. 10 is a statistical analysis routine performed during the operation of FIG. 8.
FIG. 11 is a contaminant classification routine that can be performed in conjunction with the routine of FIG. 8.

A statistical analysis routine 240 is next shown in FIG. 10. This routine corresponds to the analysis of step 206 in FIG. 8, and is carried out to test the statistical significance of two sets of data samples. While a two-sample t-test is contemplated, other forms of testing can be applied. In the present discussion, the routine will be described by comparing a baseline set of data obtained during early device manufacturing with a subsequently obtained set of data, such as during manufacturing qualification or subsequent field use.

A baseline (first) peak value data set (population) is retrieved at step 242, and a subsequent (second) peak value data set (population) is retrieved at step 244. Both sets were obtained during prior execution of the routine 220 of FIG. 9 at different times. A two-sample t-test is next carried out on the respective data sets at step 246 to test the statistical significance of the variation, if any, between the respective sets.

As will be recognized, the two-sample t-test compares data from two sets of experimental data to test the null hypothesis, to wit, whether the two sets are from the same population of data. Stated another way, the test evaluates the statistical difference between the respective sets. Assumptions include the fact that each group is considered to be a sample from a distinct population, the data points in each population are independent of those in the other group, and the distributions of the respective variables of interest are normal. While populations of different sizes can be evaluated, using populations of the same size simplifies the analysis without reducing its effectiveness. Accordingly, it is contemplated while not necessarily required that the same number of peak value sample points are provided in each population obtained during the routine 220 of FIG. 9.

The two-sample t-test involves calculation of the following values: $\bar{x}_1$ (the mean value of the first data set), $\bar{x}_2$ (the mean value of the second data set), $s_1^2$ (the variance of the first data set), $s_2^2$ (the variance of the second data set), $n_1$ (the sample size of the first set), $n_2$ (the sample size of the second set) and k (the degrees of freedom. These values may be calculated as follows:

$$\bar{x} = \frac{\sum_{1}^{n=i} x_i}{n} \quad (8)$$

$$s^2 = \frac{\sum_{1}^{n=i} (x_i - \bar{x})^2}{n-1} \quad (9)$$

$$k = n_1 + n_2 - 2 \quad (10)$$

The t-statistic can thereafter be determined as:

$$t = \frac{\bar{x}_1 - \bar{x}_2}{\sqrt{\frac{s_1^2}{n_1} + \frac{s_2^2}{n_2}}} \quad (11)$$

The calculated value of t with k degrees of freedom can be compared to the critical t value from at distribution table at a selected confidence level to decide whether to accept or reject the null hypothesis. For example, using samples sizes of seven (7) in each data set and a two-tailed 95% confidence interval, at value of at least 2.179 would result in a finding of statistical significance, and hence, the presence of contamination. Any number of sources are readily available for the tables for the t-statistic.

Continuing with the flow of FIG. 10, decision step 248 determines whether the t-statistic indicates, at the requisite confidence level, whether the two data sets are statistically different. If so, the flow passes to step 250 where contamination is declared (detected). If not, the flow passes to step 252 where a state of non-contamination is declared (detected).

Appropriate data records are stored in an appropriate memory location for future reference. If contamination is detected, corrective actions are taken as discussed above in FIG. 8. Such corrective actions may include tear-down and reworking of the data storage device, including confirmation of the detected contamination to provide additional empirical data to support the detection methodology. Other corrective actions may include changes to manufacturing processes to reduce the likelihood of occurrence of the error condition.

While a two-sample t-test is described in FIG. 10, such is merely exemplary and is not limiting. Depending on the performance of the devices, other evaluations can be carried out including other statistical tests and comparisons to the values to predetermined (or adaptively determined) thresholds. For example, the differences in the peak values of FIGS. 6-7 can suggest to the skilled artisan opportunities to determine thresholds, such as actual magnitude thresholds (e.g., normalize power level 1.5 in FIG. 7) or relative magnitude thresholds (increase of at least 20%, above baseline, etc.) to detect the statistical change in the respective populations and signify the presence of contamination.

FIG. 11 provides a contaminant classification routine 260 that may be carried out in addition to the routines discussed thus far. FIG. 11 contemplates that the presence of contamination can be detected to a statistically significant level, but also that in at least certain circumstances the type, or source, of contamination can be determined as well. It is contemplated that the routine 11 is performed after contamination is detected during the operation of the routine 240 of FIG. 10.

Accordingly, the routine 260 in FIG. 11 contemplates that empirical data will have been previously accumulated from a population of slider/media surface combinations with a view toward characterizing the types of changes in baseline response that are achieved resulting from different types of contamination. This can include shifts in the frequency bands at which the maximum frequencies appear in the PSD waveforms (see e.g., FIG. 6), different peak shapes, magnitudes, secondary peaks, and so on.

As shown in FIG. 11, upon detection of contamination from FIG. 10, the most recently generated PSD waveform, or portions thereof, are retrieved at step 262, and the characteristics of this waveform are compared to a characteristic database at step 264 to identify the likely source(s) of contamination, step 266, which is reported at step 268.

It has been found by the inventors of the present disclosure that spindle lubrication appears to be a primary source of contamination the majority of the time that contamination is detected, and therefore in most cases this may be the expected source. However, upon sufficient accumulated history it may be determined that other, less frequent forms of contamination, such as media lubrication accumulation, tend to provide different forms of response. The source of contamination can also be correlated to other parametric data, such as an increase in off-track faults versus increased variations in fly height, etc.

Figure 12:
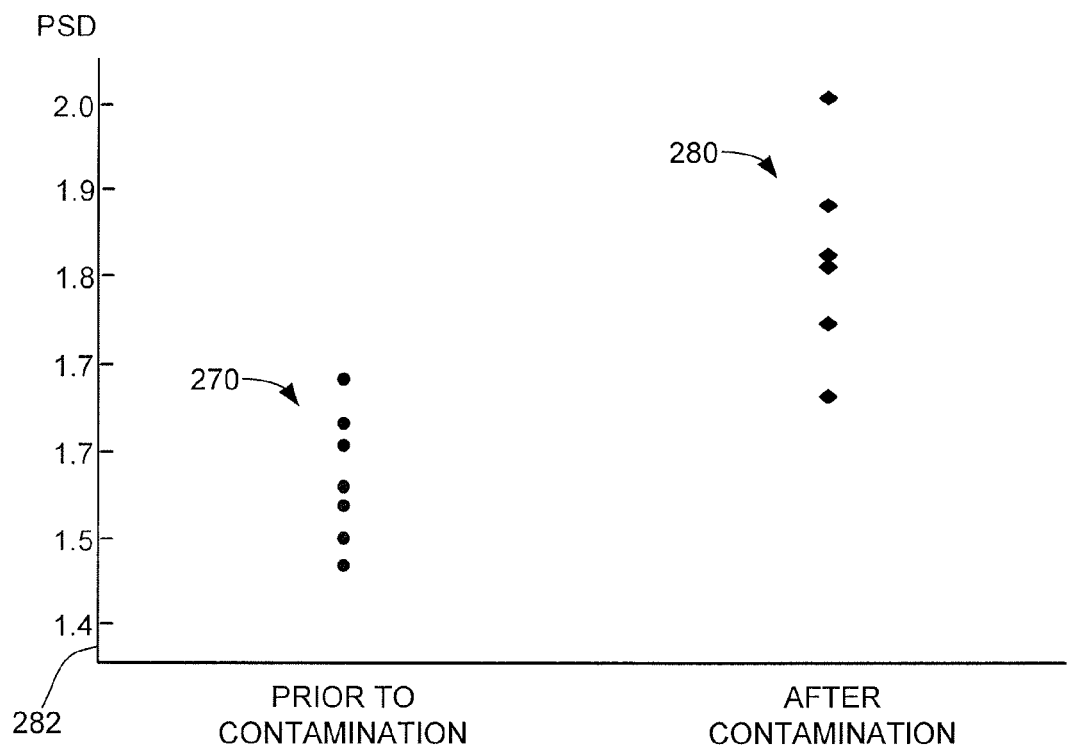
FIG. 12 shows exemplary data obtained during the routine of FIG. 8.

FIG. 12 provides graphical representations of data sets for a selected slider/media surface combination prior to (data set 270), and after (data set 280), the intentional introduction of slider contamination. The respective data sets 270, 280 are plotted against a common y-axis 282 showing PSD normalized magnitude. It can be seen that, while there is some overlap between the two sets, the uncontaminated set 270 is significantly lower than the contaminated set 280.

Assuming that the contamination source is continuing to introduce contaminants into the interior of the device 100 that will continue to accumulate on the slider 140 and degrade the performance of the device, it is expected that the separation distance between the respective data sets 270, 280 will increase over time, so that the values for the contaminated set 280 might exhibit higher values at a later date. However, the statistical analyses disclosed herein have been found to detect the presence of contamination relatively early in the process, just at the point that the respective populations begin to exhibit statistical separation. Accordingly, early detection is provided and corrective actions can be taken well before to the point where data are no longer recoverable.

Figure 13:
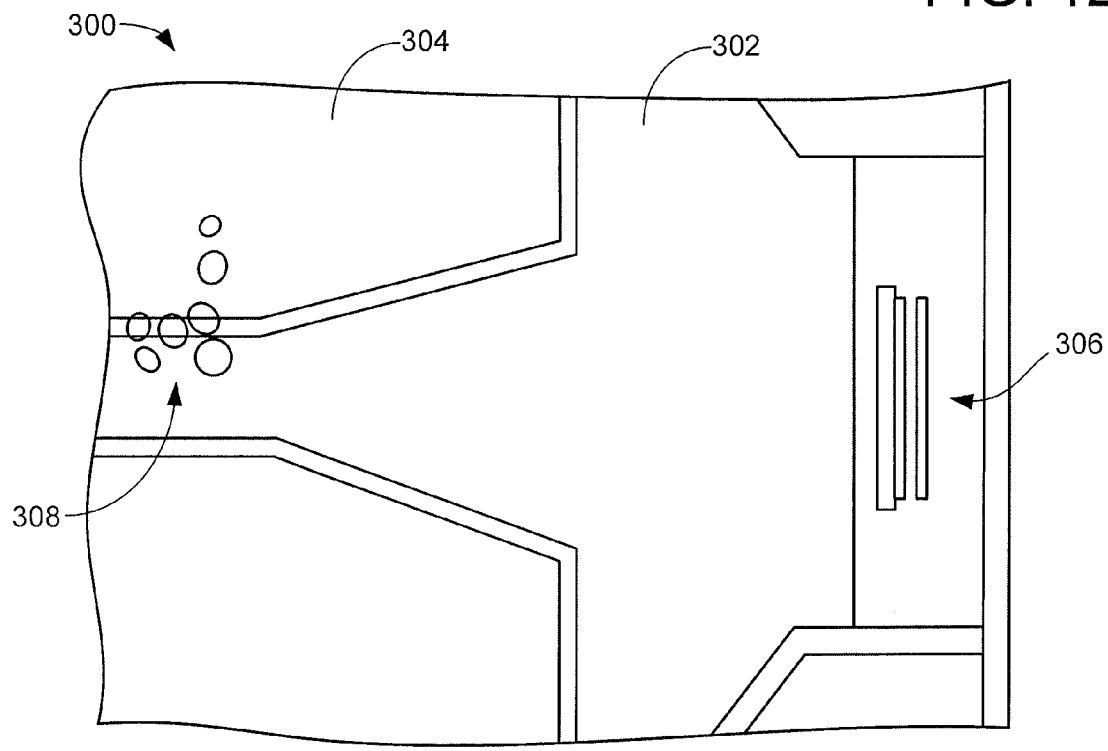
FIG. 13 is a schematic representation of slider contamination detected using the routine of FIG. 8.

FIG. 13 represents a portion of another slider 300 similar to the slider 140 discussed above. The slider 300 includes various recessed surfaces such as 302 and various raised surfaces 304 which cooperate to form an air bearing surface (ABS) as discussed above. Active read/write elements are collectively represented at 306.

Real-world observed contamination in the form of oil "splats" from a spindle motor such as 104 in FIG. 1 are generally depicted at 308. The presence of such contamination was detected using the non-destructive and non-invasive techniques set forth by the routine of FIG. 8, and was confirmed by subsequent visual inspection, the results of which are represented in FIG. 13.

While various embodiments have utilized peak values in the response curves for the statistical analysis, other characteristics can be used including shifts in frequency of the peak(s), etc. For example, the frequencies at which the peaks occur can be accumulated and used to determine whether there is a likelihood of the presence of contamination.

It will now be appreciated that the various embodiments disclosed herein can provide a number of benefits. Utilizing the NRRO component of PES signals can provide information that can be statistically correlated to the presence of even very small, initial stages of slider contamination. The ability to use a non-destructive, non-invasive test allows clearance testing for a large population of devices and ensures better quality control and reliability of the devices. While various embodiments have contemplated operations during device manufacturing processing, such processing can also be applied during field use, including during evaluation of devices by a user or by authorized agents. Finally, while embodiments have contemplated use of a separate host device to carry out portions of the analysis, adapting the process to be wholly self-contained as a self-diagnostic at the data storage device level can readily be implemented.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:
1. A method comprising:
  extracting a non-repeatable runout (NRRO) component of a position error signal (PES) obtained from readback signals transduced from a read element supported by a slider adjacent a rotating data recording medium;
  performing a power spectral density (PSD) analysis of the NRRO component and identifying a peak power level therefrom; and detecting a presence of contamination on the slider responsive to the peak power level.

2. The method of claim 1, wherein the presence of contamination is detected by generating a first population of peak power levels at a first time at which contamination is unlikely, subsequently generating a second population of peak power levels at a second time, and performing a statistical analysis of the first and second populations.

3. The method of claim 2, wherein a two-sample t-test is performed to evaluate a statistical difference between the first and second populations.

4. The method of claim 2, wherein the first and second populations include a common total number of peak power levels.

5. The method of claim 1, wherein the detecting the presence of contamination comprises comparing an average peak power level to a predetermined threshold value.

6. The method of claim 5, wherein the predetermined threshold value comprises a selected increase over a previously obtained baseline peak power level.

7. The method of claim 1, further comprising applying corrective action to remove the contamination from the slider responsive to the detection of the presence of contamination during the detecting step.

8. The method of claim 1, further comprising identifying a source of the contamination responsive to the peak power level.

9. The method of claim 1, wherein the PSD analysis upon the NRRO component generates a PSD waveform having at least one peak, and the method further comprises determining the peak power level as a maximum value of the PSD waveform.

10. The method of claim 1, further comprising generating a first population of peak power levels for a first track on the medium to establish a baseline population of peak power levels during device manufacturing, subsequently generating a second population of peak power levels for the first track on the medium to establish a second population of peak power levels, and performing a two-sample t-test between the first and second populations to detect the presence of contamination that has accumulated onto the slider after the generating of the first population of peak power levels and prior to the generation of the second population of peak power levels.

11. The method of claim 1, further comprising using the read element to transduce servo position signals from the medium to provide a sequence of actual position signals, and combining the actual position signals with target position signals to generate a sequence of PES values, wherein the NRRO component is extracted from the sequence of PES values.

12. The method of claim 11, wherein the sequence of PES values is obtained responsive to a track following operation in which the read element operates in a track following mode so as to be nominally positioned over a selected track on the medium over a plural succession of rotations of the medium.

13. An apparatus comprising:
a rotatable data recording medium;
a slider having an air bearing surface (ABS) adapted to interact with fluidic currents established by rotation of the medium to hydrodynamically support the slider adjacent thereto;
a read element adapted to generate position signals indicative of the position of the slider relative to a track defined on the medium; and
a slider contaminant analysis engine which detects a presence of contamination on the slider responsive to a peak power level in a power spectral density (PSD) waveform obtained from a non-repeatable runout (NRRO) component of a position error signal (PES) obtained in relation to the position signals generated by the read element.

14. The apparatus of claim 13, further comprising a housing in which spindle motor adapted to rotate the medium at a constant velocity, wherein the contaminant detected by the slider contaminant analysis engine comprises lubricant of the spindle motor which has leaked therefrom.

15. The apparatus of claim 13, wherein the presence of contamination is detected by the slider contaminant analysis engine generating a first population of peak power levels at a first time at which contamination is unlikely, subsequently generating a second population of peak power levels at a second time at which contamination is possible, and performing a statistical analysis of the first and second populations.

16. The apparatus of claim 15, wherein the slider contaminant analysis engine performs a two-sample t-to evaluate a statistical difference between the first and second populations to detect said slider contamination.

17. The apparatus of claim 13, wherein the slider contaminant analysis engine comprises an NRRO extractor to extract the NRRO component of the PES, a PSD module to generate the PSD waveform from the NRRO component, a peak detector module to identify a peak value of the PSD waveform, and a statistical analysis module which detects the presence of contamination responsive to a statistical analysis of different first and second populations of peak values from the peak detector module.

18. The apparatus of claim 13, characterized as a data storage device further comprising a programmable controller, and wherein the slider contaminant analysis engine comprises programming used by the programmable controller to detect said slider contamination.

19. The apparatus of claim 13, wherein the slider contaminant analysis engine generates a first population of peak power levels for a first track on the medium to establish a baseline population of peak power levels, subsequently generates a second population of peak power levels for the first track on the medium to establish a second population of peak power levels, and performs a two-sample t-test between the first and second populations to detect the presence of contamination that has accumulated onto the slider after the generating of the first population of peak power levels and prior to the generation of the second population of peak power levels.

20. An apparatus comprising:
a data storage device comprising a rotatable data recording medium, a a slider having an air bearing surface (ABS) adapted to interact with fluidic currents established by rotation of the medium to hydrodynamically support the slider adjacent thereto, a read element adapted to generate position signals indicative of the position of the slider relative to a track defined on the medium and a servo circuit adapted to generate a position error signal (PES) in relation to the position signals generated by the read element; and
a host processing device connected to the data storage device comprising a slider contaminant analysis engine adapted to detect a presence of contamination on the slider, the slider contaminant analysis engine comprising a non-repeatable runout (NRRO) extractor to extract an NRRO component of the PES, a power spectral density (PSD) module to generate a PSD waveform of the NRRO component, a peak detector module to identify a peak value of the PSD waveform, and a statistical analysis module which detects the presence of contamination responsive to a two-sample t-test between first and second populations of peak values from the peak detector module.

\* \* \* \* \*